United States Patent [19]

Heisler

[11] 3,747,650
[45] July 24, 1973

[54] AUXILIARY TOOL ADAPTER FOR ELECTRIC HAND SAWS

[76] Inventor: Clarence J. Heisler, R.R. No. 2, Springport, Mich. 49284

[22] Filed: Jan. 18, 1971

[21] Appl. No.: 107,292

[52] U.S. Cl. .............................. 144/1 E, 144/35 A
[51] Int. Cl. ................................. B27c 9/02
[58] Field of Search ............ 143/43 R, 43 A, 32 R; 144/35 R, 35 A, 1 R, 1 E; 51/170 R, 170 PT; 408/20

[56] References Cited
UNITED STATES PATENTS

| | | | |
|---|---|---|---|
| 2,544,810 | 3/1951 | Strandberg | 144/1 E |
| 1,967,163 | 7/1934 | Thearle | 51/169 |
| 3,384,135 | 5/1968 | Frydenlund | 143/6 G |
| 3,583,106 | 6/1971 | Dobbertin | 143/43 A |
| 3,056,439 | 10/1962 | Hall et al. | 144/35 A |

Primary Examiner—Donald R. Schran
Attorney—Roy A. Plant and Samuel Kurlandsky

[57] ABSTRACT

A power tool attachment is provided which is adapted to be attached to a hand-held circular blade power saw, of the type commonly referred to as a "skil-saw." The attachment comprises a base adapted to be clamped to the base of the saw, and a mandrel maintained in a position elevated above the saw base, having a rotatably mounted shaft and pulley affixed thereto. The shaft is driven by means of a flexible endless belt engaging the pulley and operated by a second pulley mounted on the motor shaft and engaged by the belt. Means are provided on the end of the shaft for attachment to various rotatable tools, or to a chuck which may be utilized in engaging the shafts of various types of rotary tools.

In an alternative embodiment, an integral saw with its base portion including an arbor mounting means having a rotatable shaft is provided for accomplishing the same purposes.

8 Claims, 9 Drawing Figures

INVENTOR
CLARENCE HEISLER

BY Plant & Kurlandsky
ATTORNEYS

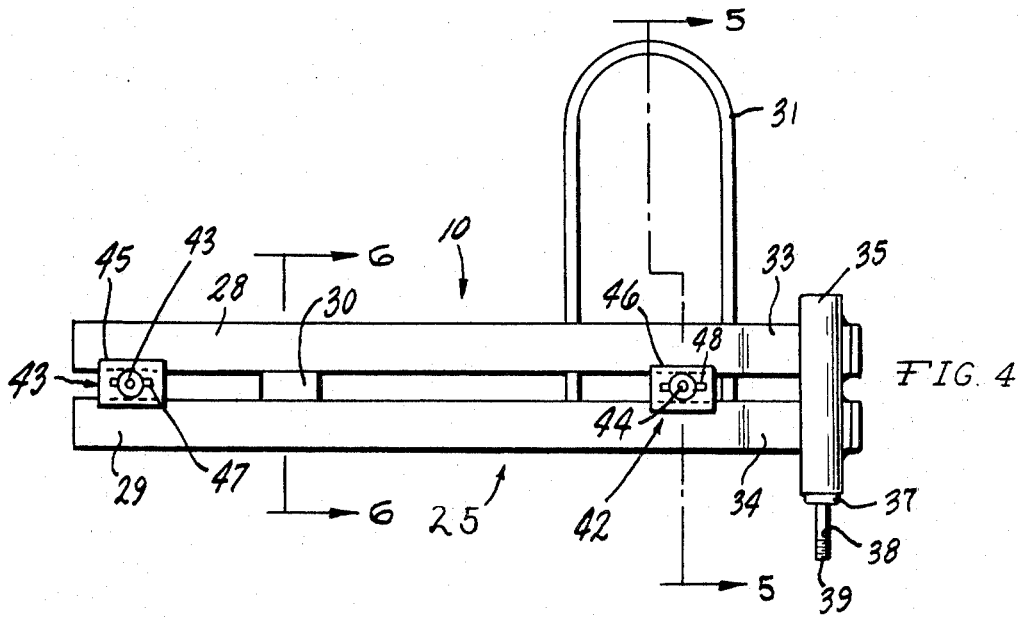
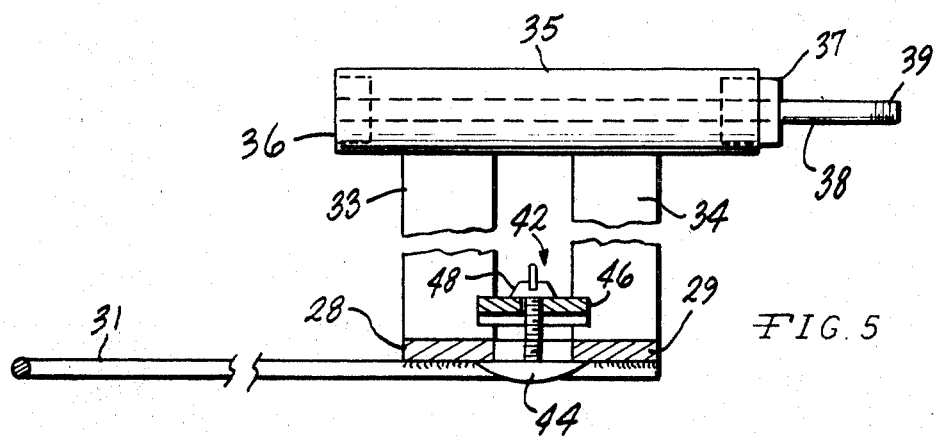
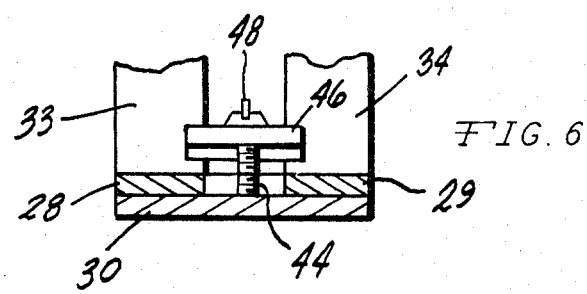
INVENTOR
CLARENCE HEISLER
BY Plant & Kurlandsky
ATTORNEYS 3,747,650

AUXILIARY TOOL ADAPTER FOR ELECTRIC HAND SAWS

BACKGROUND OF THE INVENTION

It has long been customary to provide various types of tool attachments to be operated in conjunction with existing power tools in order to render the power tools more versatile. The most common have been the various attachments designed to be used together with an electric drill. However, such applications have the disadvantages that ordinarily the motors utilized for powering hand-operated drills are not exceptionally powerful. Moreover, such drills do not normally have means for varying the speed of the attachment or means for holding and bracing the assembly in use. More recently, power tool attachments have been provided for use with chain saws since such saws generally have powerful motors. However, it is generally quite dangerous to operate such equipment, since it is normally difficult to remove the cutting teeth-bearing chain when it is desired to operate the equipment in conjunction with a power attachment.

SUMMARY OF THE INVENTION

Accordingly, it is an object of the present invention to provide a power tool attachment designed to be utilized in combination with a hand-held portable circular power saw.

It is an additional object to provide an attachment of the type described which may be readily attached to any type of hand-held circular power saw having a base.

It is still another object to provide a power saw attachment of the type described which may be used to rotate tool attachments at various speeds.

It is still another object to provide a power saw attachment which may be readily adapted for use in carrying out a variety of functions under safe conditions.

It is still another object to provide an attachment for a power saw which is relatively simple and inexpensive to build and to operate.

It is still another object to provide a novel hand-held power-operated circular saw having integral means provided upon which power tool attachments may be mounted.

Still further objects and advantages of the invention will appear as the description proceeds.

To the accomplishment of the foregoing and related ends, the invention, then, consists of the useful power tool attachment herein fully described and particularly pointed out in the claims, the annexed drawings, and the following description setting forth in detail certain illustrative embodiments of the invention, such disclosed embodiments illustrating, however, but several of the various ways in which the principle of the invention may be used.

BRIEF DESCRIPTION OF THE DRAWINGS

In the annexed drawings:

FIG. 4 is a top plan view of the power tool attachment shown in FIG. 3.

FIG. 5 is a cross-sectional view taken at the line V—V of FIG. 4, looking in the direction of the arrows.

FIG. 6 is a cross-sectional view taken at the line VI—VI of FIG. 4, looking in the direction of the arrows.

DESCRIPTION OF THE SPECIFIC EMBODIMENTS

Figure 1:
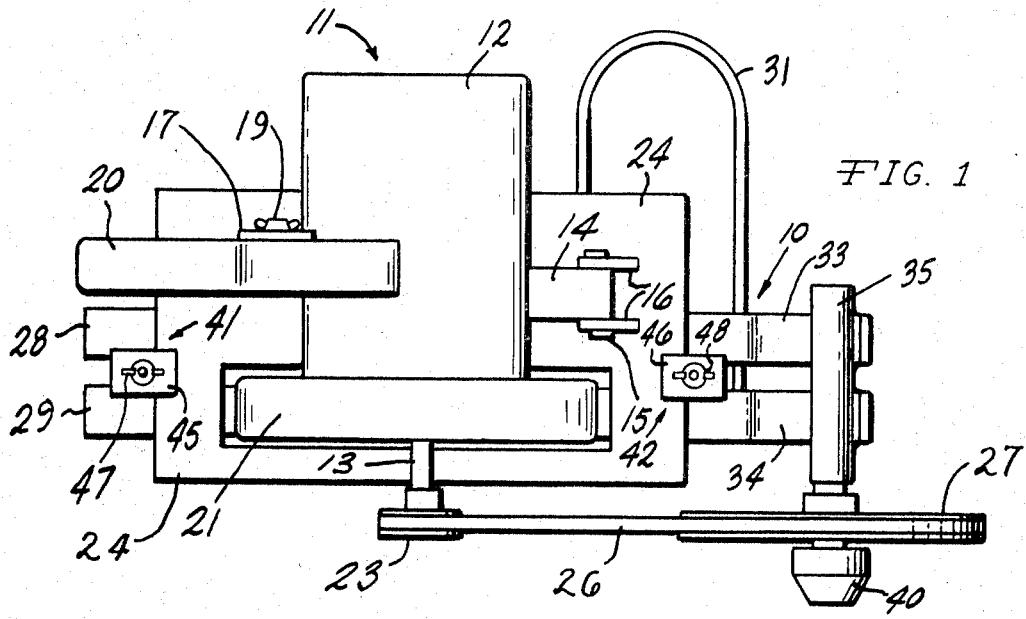
FIG. 1 is a top plan view of the power tool attachment of the invention mounted on a hand-held power-operated circular saw.

Referring more particularly to FIGS. 1–7, the apparatus shown comprises a power tool attachment 10 mounted on a hand-held power-operated circular saw 11. The saw 11 comprises a motor 12 having a rotatable shaft 13 and a pulley 23 mounted thereon. The motor 12 is mounted on a base 24 by means of a pivoted mounting bracket 14 pivotally supported at its end by engagement with a pin 15 supported by a trunnion 16. The motor is supported at the rear by a brace 17, FIG. 7, mounted on the base 24. The brace 17 is provided with an arcuate slot 18 which adjustably supports the motor 12 by means of a thumbscrew 19. A handle 20 is affixed to the motor. The saw 11 also has a conventionally provided fixed guard 21, FIGS. 1 and 2, and sring loaded pivoted guard 22, FIG. 7.

The power tool attachment 10, as shown in greater detail in FIGS. 3–6, inclusive, comprises a base 25, FIG. 4, formed of a pair of substantially parallel spaced-apart rails, straps or bars 28 and 29 having a cross brace 30 welded thereto, and a U-shaped handle 31 also welded to the rails 28 and 29. The space between the rails serves as an adjustment slot for the attachment clamping assemblies 41 and 42. The rails 28 and 29 have at one end upturned mandrel supports 33 and 34 having a mandrel sleeve 35 welded to the ends thereof. Mounted in the mandrel sleeve 35, shown in greater detail in FIG. 5, are a pair of bearings 36 and 37, which may be sleeve bearings, roller bearings, ball bearings, or any other suitable type of bearings, and it is intended that the showing be considered as diagrammatically illustrating same. A shaft 38 is journaled in the bearings 36 and 37 and is provided with a threaded end 39 which may engage a chuck 40, shown in FIGS. 1 and 2 or, alternatively, which may directly engage a tool such as a grinding wheel having a fitting with complementary threads integrally provided.

Figure 2:
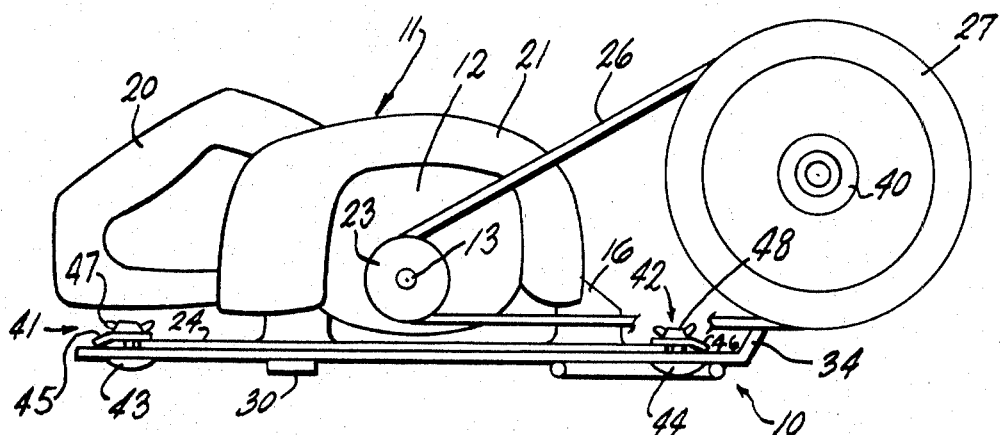
FIG. 2 is a side elevational view of the apparatus shown in FIG. 1.
Figure 3:
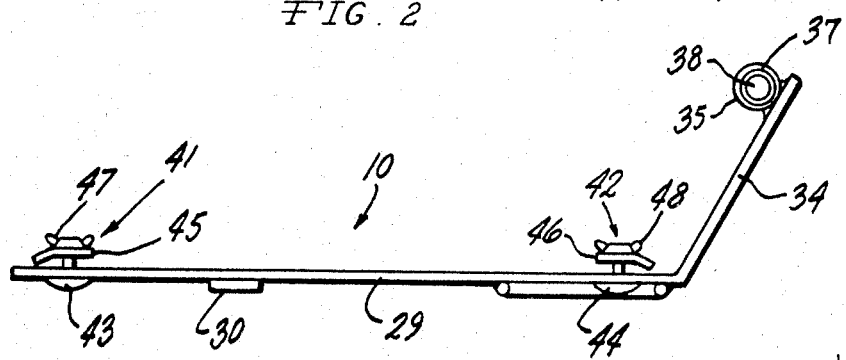
FIG. 3 is a side elevational view of the power tool attachment shown by itself.
Figure 7:
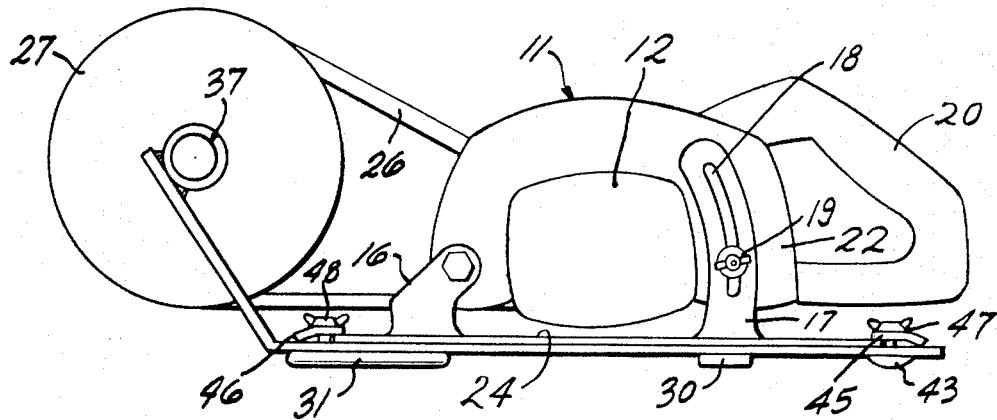
FIG. 7 is a side elevational view of the apparatus shown in FIG. 2, taken from the other side.

In order to affix the power tool attachment to the saw base 24, clamp assemblies 41 and 42, FIGS. 1 and 2, are provided comprising bolts 43 and 44 whose heads engage the rails 28 and 29 and having shafts extending through the adjustment slots therebetween. The bolts also extend through apertures in arcuate clamp members 45 and 46 and are engaged by wing nuts 47 and 48. Alternatively, steel washers may be used in place of the arcuate clamp members 45 and 46, and it is intended that the showing be considered to diagrammatically illustrate same.

In mounting the present power tool attachment on a saw, the nut which normally holds the saw blade is removed together with the saw blade. The pulley 23 is then attached to the motor shaft 13. The attachment 10 is placed over the base 24 of the saw. As the attachment is brought toward the base 24, the pivoted guard 22 engages the rail 29 and is raised and maintained in the raised position. The adjustable clamps 41 and 42 are moved until the ends of the arcuate clamp members extend over the forward and rear edges of the base 24. The wing nuts 47 and 48 are then tightened sufficiently to clamp the attachment to the saw base. The belt 26 is then engaged over the pulley 23 and the pulley 27. The thumbscrew 19 may be loosened and adjusted in the arcuate slot until the belt is properly tightened. Any suitable tool may be mounted in the chuck 40, FIGS. 1 and 2, or alternatively, directly on the end of the threaded shaft 39. The entire assembly may be grasped by the saw handle 20 and the U-shaped handle 31 and used for any of a large number of operations such as drilling, sanding, grinding, buffing, et cetera. Additionally, by the use of a suitable coupling attachment the apparatus may be used to start lawn mower engines.

Because the motors conventionally utilized in hand-operated circular power saws are quite powerful, the apparatus is adaptable for use where ordinary electric drills would not be suitable. Moreover, because a flexible belt connects the motor to the shaft which operates the attachment tools, an element of safety is provided, since the belt permits the pulleys to slide if too great or too sudden a load is applied. Moreover, the speed of the mandrel shaft 38 may be changed by changing the relative sizes of the pulleys 23 and 27. For example, with a small pulley utilized for the pulley 23, the use of the pulley having a diameter of five inches for the pulley 27 will provide about 1700 revolutions per minute. The use of a 7-inch diameter pulley will result in a speed of about 1000 r.p.m. Still other speeds may be obtained by the judicious selection of various size pulleys.

The attachment of the present invention greatly increases the versatility of the common hand-supported power circular saw. It permits a large number of attachments to be utilized, provides a great deal of power to drive various attachments, permits the speed of the shaft driving the attachments to be changed to suit the particular use, and permits rapid change from one type of tool to another. Additionally, the unit itself is extremely simple to mount on a conventional power circular saw.

Figure 8:
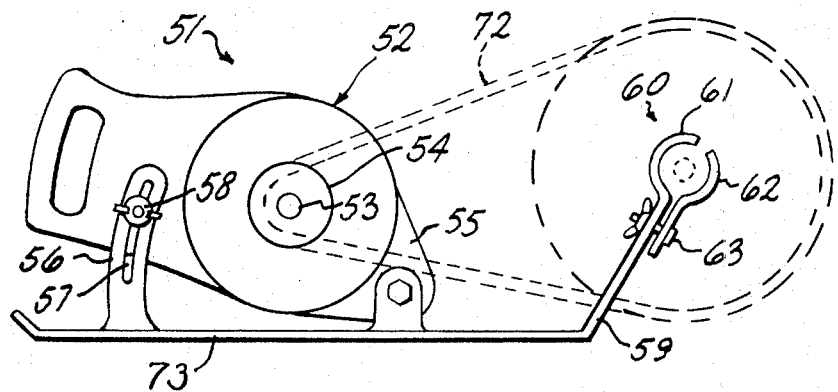
FIG. 8 is a side elevational view of another embodiment of the present invention, with a removable portion thereof shown in broken lines.
Figure 9:
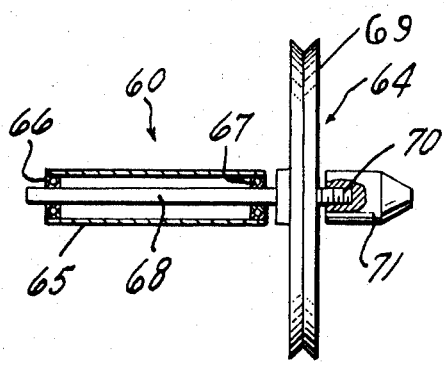
FIG. 9 is an elevational view partly in cross-section, showing a sub-assembly portion of the invention shown in FIG. 8.

FIGS. 8 and 9 illustrate another embodiment of the invention in which the leg or bracket for supporting the mandrel is manufactured as an integral part of the base of the saw, either as an extension of the base, or else, riveted or bolted thereto. As shown in the drawings, the integral power saw and attachment unit comprises a power saw 51 having a motor 52, a shaft 53, and a pulley 54 mounted on the shaft 53. The motor is pivotally and adjustably mounted at the other end of the base 73 by means of an adjustable bracket 56 mounted at one end to the base and having a slot 57 provided therein. A bolt and wing nut combination 58 clamps the motor in any desired position. The arrangement is useful both for determining the depth of saw cut when a saw blade is mounted on the motor, and additionally for tightening a belt 72 utilized to drive the power attachments. An arbor support 59 is provided as an integral part of the base 73 and is provided with a clamp 60 at its other end comprising a fixed clamp jaw 61, an adjustable clamp jaw 62, and a bolt and wing nut combination 63 for tightening the clamp.

Mounted within the clamp 60 is an arbor 64 comprising a mandrel sleeve 65, bearings 66 and 67, and a shaft 68 journaled in the bearings. A pulley 69 is affixed to the shaft 68 for driving the shaft. The end of the shaft 68 is provided with a threaded end 70 having a chuck 71 mounted thereon. The belt 72 is adapted to be engaged over the pulleys 54 and 69.

The apparatus thus shown in FIGS. 8 and 9 may be utilized in substantially the same ways as that previously shown and described. It is contemplated that the entire unit would be manufactured by the original equipment manufacturer, and could be sold at a price less than the combined price of the saw and separate attachment (described in FIGS. 1–6).

While but two forms of the invention have been shown and described, other forms within the spirit and scope of the invention will now be apparent to those skilled in the art. Therefore, the embodiments shown in the drawings are to be considered as merely setting forth the invention for illustrative purposes and are not intended to limit the scope of the invention herein described and shown.

Other modes of applying the principle of my invention may be employed, instead of those explained, change being made as regards the apparatus herein disclosed, provided the means stated by any of the following claims or the equivalent of such stated means be employed.

I therefore particularly point out and distinctly claim as my invention:

1. An apparatus adapted to be utilized for oprating power attachments comprising in combination:
    a. an assembly from a hand-held electric power-operated circular saw comprising
       1. a base,
       2. a motor adjustably mounted on said base having a rotatable shaft,
       3. a pulley mounted on said shaft, and
       4. a handle mounted on said saw; and
    b. power tool attaching means comprising
       1. a base having upwardly offset mandrel supporting means,
       2. a mandrel mounted on said mandrel supporting means having a shaft rotatably journaled therein,
       3. a pulley mounted on said shaft,
       4. means on said shaft for securing tool attachments thereto,
       5. means securing the base of said assembly to the base of said power tool, and
       6. a flexible endless belt operatively mounted on said pulleys.

2. A power tool attachment adapted to be mounted on as assembly taken from a hand-held electrical power-operated circular saw, said assembly comprising a base, a motor adjustably mounted on said base, and a handle, said attachment comprising:
    a. a base having upwardly offset mandrel supporting means,
    b. clamping means for mounting said base on the base of said saw,
    c. mandrel supporting means mounted on said base,
    d. a mandrel mounted on said mandrel supporting means,
    e. a shaft rotatably journaled within said mandrel,
    f. a pulley mounted on said shaft, g. means at the end of said shaft for mounting tool attachments, the shaft of said mandrel being adapted to be driven by a pulley mounted on the shaft of said motor and operatively connected to the pulley mounted on said mandrel shaft by means of a flexible endless belt.

3. A power tool attachment according to claim 2, wherein said mandrel comprises a tubular housing having a bearing mounted at each end with said mandrel shaft journaled therein.

4. A power tool attachment according to claim 2, wherein said clamping means (b) comprises an arcuate clamp member, a bolt engaged in an adjustment slot provided in said attachment base (a), said bolt extending through an aperture provided in said arucate clamp member, and a nut engaging the threads at the end of said bolt for tightening said clamp member in place.

5. A power tool attachment according to claim 2, having a handle affixed to said power tool attachment base to facilitate holding and manipulation when in operation.

6. A power tool attachment according to claim 5, wherein said handle is in the form of a U-shaped rod.

7. A power tool attachment according to claim 2, wherein said mandrel supporting means (c) is offset upwardly sufficiently to permit rotating tool attachments mounted at the end of said mandrel shaft to clear a surface upon which said saw and attachment may be placed.

8. A power tool attachment according to claim 2, wherein said base (a) comprises a pair of metal bars maintained in substantially parallel spaced-apart position, the space intermediate said bars serving as a slot adjustably engaged by said clamping means (b).

* * * * *